United States Patent [19]

Shams

[11] Patent Number: 5,526,501
[45] Date of Patent: Jun. 11, 1996

[54] VARIABLE ACCURACY INDIRECT ADDRESSING SCHEME FOR SIMD MULTI-PROCESSORS AND APPARATUS IMPLEMENTING SAME

[75] Inventor: Soheil Shams, Redondo Beach, Calif.

[73] Assignee: Hughes Aircraft Company

[21] Appl. No.: 106,343

[22] Filed: Aug. 12, 1993

[51] Int. Cl.$^6$ ............................ G06F 12/02; G06F 15/80
[52] U.S. Cl. ................ 395/421.07; 395/800; 395/421.11; 364/DIG. 1
[58] Field of Search .................................. 395/400, 425, 395/800

[56] References Cited

U.S. PATENT DOCUMENTS

| | | | |
|---|---|---|---|
| 4,065,808 | 12/1977 | Schomberg et al. | 395/800 |
| 5,129,092 | 7/1992 | Wilson | 395/800 |
| 5,371,896 | 12/1994 | Gove et al. | 395/800 |

OTHER PUBLICATIONS

Blevins, et al, "Blitzen: A Highly Integrated Massively Parallel Machine", J. Parallel and Distributed Computing, vol. 8, pp. 150–160, 1990.
Komen, "Efficient Parallelism Using Indirect Addressing in SIMD Processor Arrays," *Pattern Recognition Letters*, vol. 12, No. 5, 1991, pp. 279–289.
Fletcher et al. "A Generalised Framework for Parallel Data Mapping in Multidimensional Signal and Image Processing," *Proceedings of the Third International Symposium on Signal Processing and its Applications*, Aug. 1992, pp. 614–617.
Fisher et al., "Real–Time Image Processing on Scan Line Array Processors," IEEE Computer Workshop for Pattern Analysis and Real–Time Image Processing on Scan Line Array Processors, Mar. 1985, pp. 484–489.
Fraser, "Array Permutation by Index–Digit Permutation", *Journal of the Assocation for Computing Machinery*, vol. 23, No. 2, Apr. 1976, pp. 298–309.
Fountain et al., "The CLIP7A Image Processor," IEEE Transactions of Pattern Analysis and Machine Intelligence, vol. 10, No. 3, May 1988, pp. 310–319.
Middleton et al., "Evaluating Indirect Addressing in SIMD Processors,"Institute for Computer Application in Science and Engineering, Report No. 89–30, May 1989, pp. 1–18.
Fried et al., "NAP (No ALU Processor) The Great Communicator," *Proceedings of the Second Symposium on the Frontiers of Massively Parallel Computation*, Feb. 1989, pp. 383–389.
Tomboulian et al., "Indirect Addressing and Load Balancing for Faster Solution to Mandelbrot Set on SIMD Architectures" Fifth Annual Massively Parallel Symposium, Apr. 1989, pp. 443–450.

*Primary Examiner*—Michael A. Whitfield
*Attorney, Agent, or Firm*—Vijayalakshmi D. Duraiswamy; Wanda K. Denson-Low

[57] ABSTRACT

In a parallel processing architecture following the Single Instruction stream Multiple Data stream execution paradigm where a controller element is connected to at least one processing element with a local memory having a local memory address shift register adapted to receive and retain therein a globally broadcast memory base register address value received from the controller element for use by the processing element for access and transfer of data between the processing element and its respective local memory, a computer architecture for implementing indirect addressing and look-up tables includes a processing element shift register associated with the at least one processing element and adapted to receive and retain therein a local memory offset address value calculated or loaded by the associated processing element in accord with a first predetermined set of instructions. The processing element shift register transfers its contents bitwise to the local memory shift register of the local memory associated with the processing element, with the bit value of the most significant bit position being sequentially transferred to the least significant bit position of the local memory shift register in accord with a second predetermined set of instructions. A parallel transfer of the contents of the two shift registers is also disclosed.

10 Claims, 3 Drawing Sheets

VARIABLE ACCURACY INDIRECT ADDRESSING SCHEME FOR SIMD MULTI-PROCESSORS AND APPARATUS IMPLEMENTING SAME

BACKGROUND OF THE INVENTION

1. Field of the Invention

This invention relates in general to computer architectures, and, more particularly, to a method and an apparatus for enabling indirect addressing and lookup table implementation on Single Instruction stream Multiple Data stream (SIMD) multi-processor architectures.

2. Description of the Related Art

In existing SIMD computer architectures, memory is generally accessed by the processor array as a single plane of memory locations.

In conventional SIMD architectures, the memory address location is broadcast, along with the instruction word, to all processing elements by the controller. This configuration normally results in the processing elements accessing a single plane of data in memory. Offsets from this plane of data cannot be done using this architecture, as there is no provision for specifying, or modifying, the local memory address associated with each processor based on local data in each processor.

As a consequence of this lock-step approach, it is especially difficult to implement efficiently indirect addressing and look-up tables in a parallel processing architecture following the Single Instruction stream Multiple Data stream execution paradigm. Indirect addressing requires serialization of operations and thus uses O(N) cycles to perform the memory access in an N processor system.

SUMMARY OF THE INVENTION

Generally, the present invention is embodied in a method and computer architecture for implementing indirect addressing and look-up tables in a parallel processing architecture following the Single Instruction stream Multiple Data stream execution paradigm.

SIMD architecture utilizes a controller element connected to an array of processing elements where each processing element has associated with it a local memory that has a local memory address shift register. The local memory address shift register is adapted to receive and retain a globally broadcast memory base register address value received from the host, or from the controller element, for use by the processing element in accessing and transferring data between the processing element and its respective local memory.

Each of the processing elements is further associated with a processing element shift register that is adapted to receive and retain a local memory offset address value calculated or loaded by the processing element in accord with a first predetermined set of instructions. The processing element shift register is also further adapted to transfer its contents bitwise to the local memory shift register of its associated local memory, with the bit value of the most significant bit position being sequentially transferred to the least significant bit position of the local memory shift register in accord with a second predetermined set of instructions.

As an alternative, the processing element shift register can also be adapted to transfer its contents to the local memory shift register of its associated local memory, in a parallel transfer as described more fully below.

The description of the invention presented is intended as a general guideline for the design and implementation of the invention into a specific implementation. Therefore, specific details of the design, such as clock rates, the number of bits in each register, etc., are left to be determined based on the implementation technology and the allotted cost of the final product. In the following, the special details of the present invention, which are unique to this invention, are elaborated.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

With reference being made to the Figures, a preferred embodiment of the present invention will now be described in a method and an apparatus for providing a platform for efficient implementation of the computation associated with processing a wide variety of neural networks.

Figure 1:
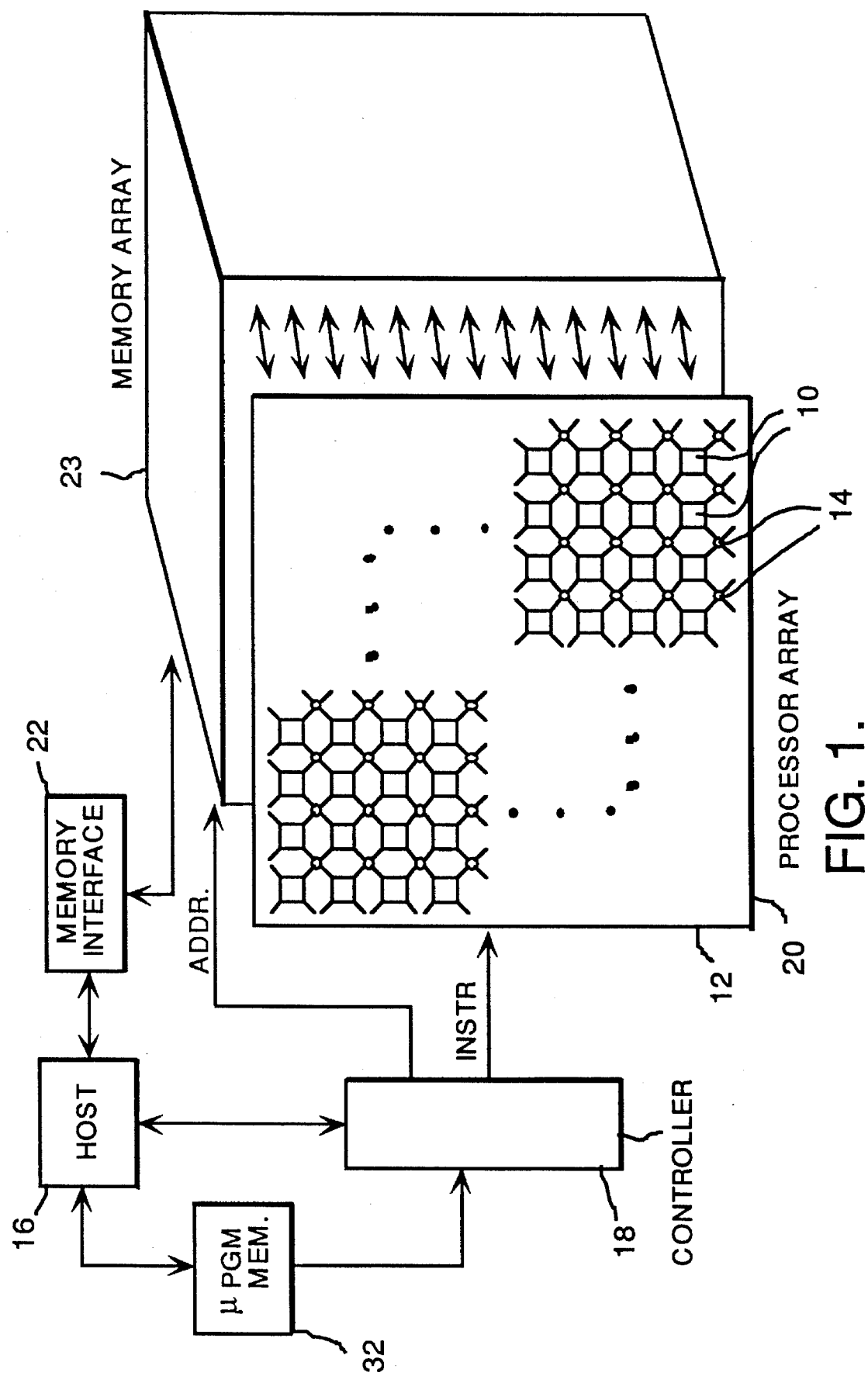
FIG. 1 is an idealized block schematic diagram illustrating the top level design of a computer architecture embodying the present invention.

The invention is embodied in a computer architecture that can roughly be classified as a Single Instruction stream Multiple Data streams (SIMD) medium or fine grain parallel computer. The top level architecture of such an embodiment is depicted in FIG. 1 where each Processing Element 10 is arranged on a two dimensional processor array lattice 12.

This architecture is most easily discussed in three major groupings of functional units: the host computer 16, the controller 18, and the Processor Array 20.

The controller unit 18 interfaces to both the host computer 16 and to the Processor Array 20. The controller 18 contains a microprogram memory area 32 that can be accessed by the host 16. High level programs can be written and compiled on the host 16 and the generated control information can be downloaded from the host 16 to the microprogram memory 32 of the controller 18. The controller 18 broadcasts an instruction and possibly a memory address to the Processor Array 20 during each processing cycle. The processors 10 in the Processor Array 20 perform operations received from the controller 18 based on a mask flag available in each Processing Element 10.

The Processor Array unit 20 contains all the processing elements 10 and the supporting interconnection network 14. Each Processing Element 10 in the Processor Array 20 has direct access to its local column of memory within the architecture's memory space 23. Due to this distributed memory organization, memory conflicts are eliminated which consequently simplifies both the hardware and the software designs.

Figure 2:
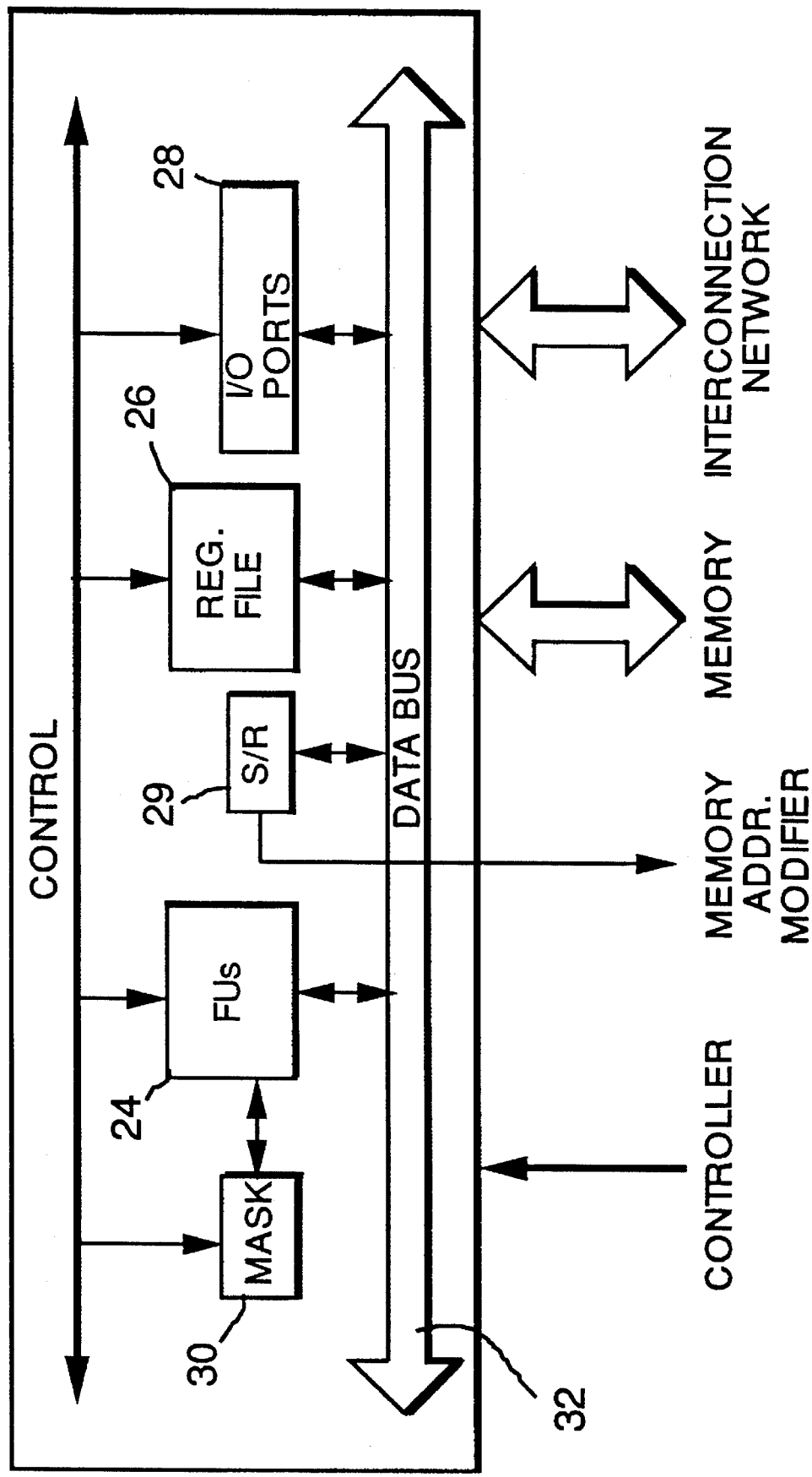
FIG. 2 is an idealized block schematic diagram illustrating the top level design of the processing elements forming the processor array in a computer architecture similar to that of FIG. 1 embodying the present invention.

In the present architecture, the Processing Element 10 makes up the computational engine of the system. As mentioned above, the Processing Elements 10 are part of the Processor Array 20 subsystem and all receive the same instruction stream, but perform the required operations on their own local data stream. Each Processing Element 10 is comprised of a number of Functional Units 24, a small register file 26, interprocessor communication ports 28, s shift register (S/R) 29, and a mask flag 30 as illustrated in FIG. 2.

In addition to supplying memory address and control instructions to the Processor Array 20, each instruction word contains a specific field to control the loading and shifting of data into the memory address modifying register 29. This field is used when the memory address supplied by the instruction needs to be uniquely modified based on some local information in each processor 10, as in the case of a table lookup.

A novel feature of a computer architecture embodying the present invention is its hardware support mechanism for implementing indirect addressing or a variable accuracy lookup table in the SIMD architecture.

Neural network models are a practical example of the use of the present invention in a SIMD architecture. Such neural network models use a variety of non-linear transfer functions such as the sigmoid, the ramp, and the threshold functions. These functions can be efficiently implemented through the use of a lookup table. Implementation of a table lookup mechanism on a SIMD architecture requires a method for generation/modification of the memory address supplied by the controller 18, based on some local value in each Processing Element 10.

A prior art architecture named BLITZEN developed by D. W. Blevins, E. W. Davis, R. A. Heaton and J. H. Rief and described in their article titled, "BLITZEN: A Highly Integrated Massively Parallel Machine," in the Journal of Parallel and Distributed Computing (1990), Vol. 8, pp 150–160, performs this task by logically ORing the 10 most significant bits of the memory address supplied by the controller, with a local register value. Such a scheme does not offer sufficient flexibility as required for general-purpose neurocomputer design. The accuracy, or level of quantization of the neuron output values tolerated by neural networks can vary significantly (from 2 to 16 bits) among different neural network models and different applications of each model.

Figure 3:
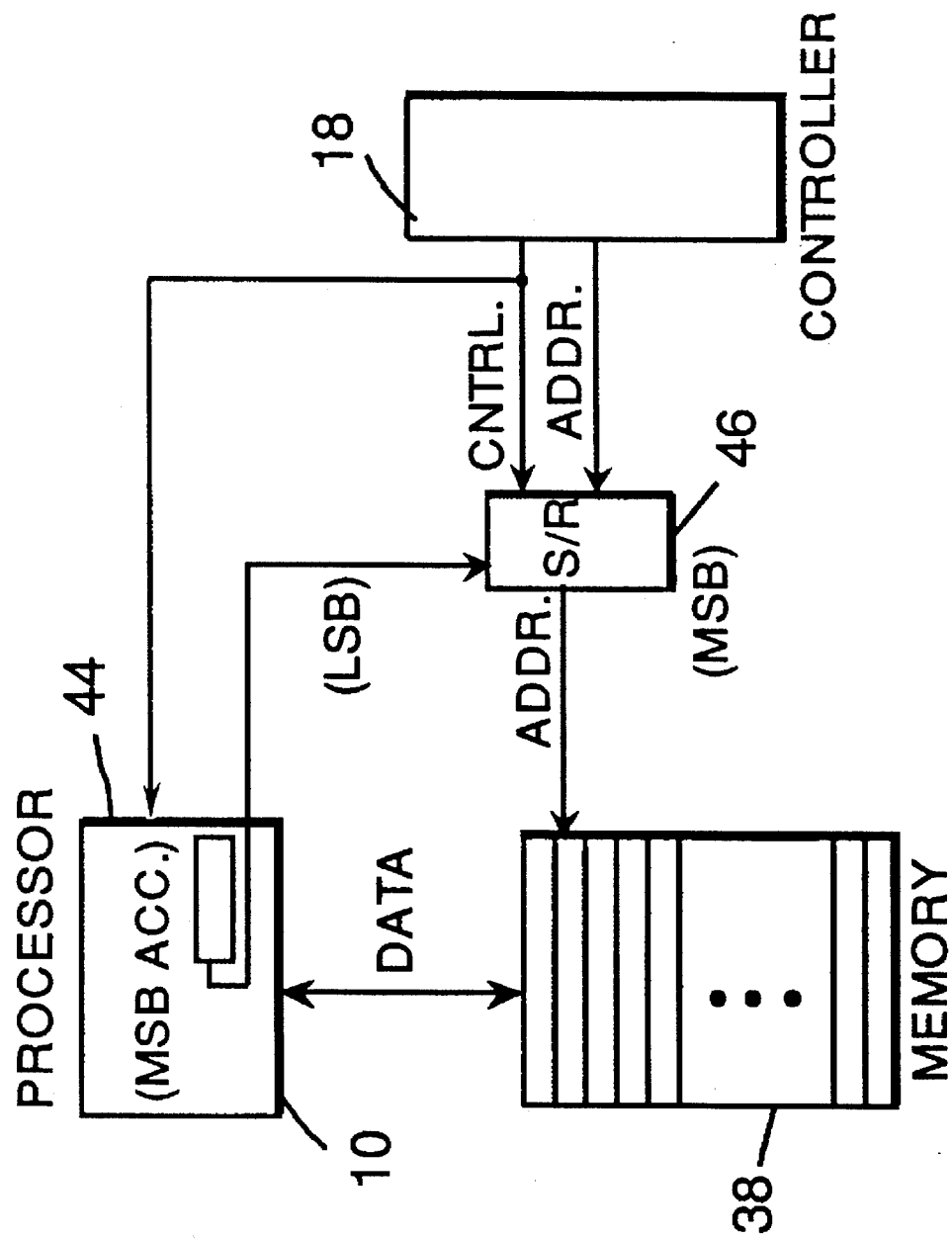
FIG. 3 is an idealized block schematic diagram illustrating the processor and memory level design in a computer architecture similar to that of FIG. 1 embodying the present invention.

In order to accommodate lookup tables of varying sizes, an architecture embodying the present invention incorporates two shift registers 44, 46 in FIG. 3 (shift register 44 in FIG. 3 is the equivalent of shift register 29 in FIG. 2) that are used to modify the address supplied by the controller 18. One shift register 44 is associated with the Processing Element 10 and keeps the data value used for addressing the lookup table. The other shift register 46 is associated with the Processing Element's local memory 38 and is used to modify the address received from the controller 18. See FIG. 3. The table lookup procedure for a table of size $2^k$ is initiated when the controller 18 loads the base address of the table to each of the shift registers 46 associated with each Processing Element's local memory 38 using a broadcast instruction. The base address value is right shifted by k bits before being broadcast by the controller 18. This will insure that the proper value is being used after the augmentation of the k bit offset value. The offset value is then shifted into this register 46 one bit at the time from the local register 44 in the Processing Element 10 starting from the most significant bit into the least significant bit of the memory address register 46. The control signals for this shifting operation are generated by the controller 18 and are broadcast to all Processing Elements 10 as part of the microinstruction word. With this procedure, an address for a table of size $2^k$ can be generated in k time steps by each processor. By using a bitwise shifting operation, variable accuracy can be achieved in accessing data from memory array 22.

If variable accuracy retrieval is not necessary, the present invention may be implemented by a parallel transfer into register 46 the contents of the local register 44 in the Processing Element 10. The advantage of the parallel shifting of data between these two registers over that of the bitwise serial shifting scheme is that only a single cycle of the architecture is needed. However, it requires more physical pins and wires for interconnection of the physical chips comprising the various functional components of the architecture and provides only a fixed accuracy into the desired table held in memory.

Similarly, the bitwise shifting scheme described above has as advantages over the parallel transfer scheme that it requires only a single pinout and wire, and provides variable accuracy into the desired memory table. However, it requires more machine cycles to shift out the register contents in a bitwise fashion than the parallel transfer of the alternate scheme.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed:

1. In a parallel processing architecture following the Single Instruction stream Multiple Data stream execution paradigm where a controller element is connected to at least one processing element with a local memory having a local memory address shift register for receiving and retaining therein a globally broadcast memory base address value received from the controller element for use by the processing element for access and transfer of data between the processing element and its respective local memory, a computer architecture for implementing indirect addressing and look-up tables comprising:

a processing element shift register, associated with the at least one processing element, for receiving and retaining therein a local memory offset address value received from the associated processing element in accord with a first predetermined set of instructions, and for transferring its contents bitwise to the local memory shift register of the local memory associated with the processing element, with the bit value of the most significant bit position being sequentially transferred to the least significant bit position of the local memory shift register in accord with a second predetermined set of instructions.

2. The computer architecture of claim 1, wherein the local memory offset address value is a value calculated by the associated processing element.

3. The computer architecture of claim 1, wherein the local memory offset address value is a value loaded into the processing element from the local memory associated with the processing element.

4. In a parallel processing architecture following the Single Instruction stream Multiple Data stream execution paradigm where a controller element is connected to at least one processing element with a local memory having a local memory address shift register for receiving and retaining therein a globally broadcast memory base address value received from the controller element for use by the processing element for access and transfer of data between the processing elements and its respective local memory, a computer architecture for implementing indirect addressing and look-up tables comprising:

a processing element shift register, associated with the at least one processing elements, for receiving and retaining therein a local memory offset address value received from the associated processing element in accord with a first predetermined set of instructions, and for transferring its contents to the local memory shift register of the local memory associated with the processing element, in a parallel transfer of bits between the two registers.

5. The computer architecture of claim 4, wherein the local memory offset address value is a value calculated by the associated processing element.

6. The computer architecture of claim 4, wherein the local memory offset address value is a value loaded into the processing element from the local memory associated with the processing element.

7. A computer architecture for implementing indirect addressing and look-up tables in a parallel processing architecture following the Single Instruction stream Multiple Data stream execution paradigm, the architecture comprising:

a controller element connected to at least one processing element, said processing element associated with a local memory having a local memory address shift register for receiving and retaining therein a globally broadcast memory base register address value received from said controller element for use by said processing element for access and transfer of data between the processing element and its respective local memory, said at least one processing element further associated with a processing element shift register for receiving and retaining therein a local memory offset address value received from said processing element in accord with a first predetermined set of instructions, and for transferring its contents bitwise to said local memory shift register of said local memory associated with the processing element, with the bit value of the most significant bit position being sequentially transferred to the least significant bit position of said local memory shift register in accord with a second predetermined set of instructions.

8. The computer architecture of claim 7, wherein the local memory offset address value is a value calculated by the associated processing element.

9. The computer architecture of claim 7, wherein the local memory offset address value is a value loaded into the processing element from the local memory associated with the processing element.

10. In a computer system having a controller connected to a plurality of processing elements, and associated with each processing element a local memory with a local memory shift register for access and transfer of data between the associated processing element and its associated local memory, a system for implementing indirect addressing and look-up tables in a parallel processing architecture following the Single Instruction stream Multiple Data stream execution paradigm, the architecture comprising:

a plurality of processing element shift registers, each associated with a respective one of the processing elements for receiving and retaining therein a local memory offset address value calculated by each associated processing element in accord with a first predetermined set of instructions, and for transferring its contents bitwise to the local memory shift register of the local memory associated with the processing element, with the bit value of the most significant bit position being sequentially transferred to the least significant bit position of the local memory shift register in accord with a second predetermined set of instructions.

* * * * *